United States Patent
Ohara et al.

(10) Patent No.: US 6,842,565 B2
(45) Date of Patent: Jan. 11, 2005

(54) OPTICAL MODULATION/MULTIPLEXING CIRCUIT

(75) Inventors: Takuya Ohara, Yokohama (JP); Hidehiko Takara, Yokosuka (JP); Ippei Shake, Yokohama (JP); Satoki Kawanishi, Kanagawa (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 56 days.

(21) Appl. No.: 10/437,586

(22) Filed: May 14, 2003

(65) Prior Publication Data

US 2003/0214698 A1 Nov. 20, 2003

(30) Foreign Application Priority Data

May 17, 2002 (JP) ........................................ 2002-143759

(51) Int. Cl.[7] .................................................. G02B 6/28
(52) U.S. Cl. .............................. 385/24; 385/1; 385/14; 385/122; 385/129; 398/98; 398/102
(58) Field of Search .......................... 385/1–3, 24, 122, 385/129–132, 14; 398/52, 53, 98, 79, 102; 359/328

(56) References Cited

U.S. PATENT DOCUMENTS

2003/0228150 A1 * 12/2003 Dave .......................... 398/98

OTHER PUBLICATIONS

M. Takara et al., "Integrated optical time–division–multiplexer based on planar lightwave circuit", OFC/IOOC '99, vol. 4, 21–26, Feb. 1999 (pp. 135–137).*

S. Kawanishi et al., "All–optical modulation and time–division–multiplexing of 100 Gbit/s signal using quasi–phase matched mixing in LiNb03 waveguides", Electronic Letters, 36(18), Aug. 2000 (pp. 1568–1569).*
Govind P. Agrawal, *Nonlinear Fiber Optics*, Second Edition, Academic Press, 1995, Chapter 10, pp. 404–407.
S. Kawanishi et al., *All–Optical Modulation and Time–Division–Multiplexing of 100 Gbit/s Signal Using Quasi–Phasematched Mixing in LiNbO$_3$ Waveguides*, Electronic Letters, vol. 136, No. 18, Aug. 31, 2000, pp. 1568–1569.
F. Ebisawa et al., *High–Speed 32–Channel Optical Wavelength Selector Using PLC Hybrid Integration*, Technical Digest of Optical Fiber Communication Conference (OFC), paper ThB1, San Diego, 1999.

* cited by examiner

*Primary Examiner*—Leo Boutsikaris
(74) *Attorney, Agent, or Firm*—Workman Nydegger

(57) ABSTRACT

An optical modulation/multiplexing circuit can fabricate a plurality of nonlinear optical waveguide devices and silica optical waveguides through a small number of processes, and achieve the simplification of the fabrication process and stabilization of the operation by hybrid integration with reduced connection loss. It employs lithium niobate domain inversion optical waveguides as nonlinear optical switches, and implements functions necessary for modulation and multiplexing such as input, splitting, multiplexing and timing adjustment of optical modulation signals and an optical clock signal by connecting glass waveguides to the input and output terminals of the domain inversion optical waveguides. Nonlinear optical media generate a second harmonic light beam of the optical clock signal, and at the same time produces a light beam with a frequency corresponding to the difference frequency of the two high frequency signals, the second harmonic light beam and the signal pulses.

6 Claims, 5 Drawing Sheets

US 6,842,565 B2

OPTICAL MODULATION/MULTIPLEXING CIRCUIT

This application claims priority from Japanese Patent Application No. 2002-143759 filed May 17, 2002, which is incorporated hereinto by reference.

BACKGROUND OF THE INVENTION

1. Field of the Invention

The present invention relates to an optical modulation/multiplexing circuit, and more particularly to an optical modulation/multiplexing circuit of high-bit-rate optical pulses used for ultra-high-speed optical communications.

2. Description of the Related Art

FIG. 4 is a block diagram showing a configuration of a conventional optical modulation/multiplexing circuit. The circuit comprises an optical modulation signal input port 401 (four channels in FIG. 4), an optical clock input port 402, a multiplexed optical signal output port 403, an optical filter 404, a planar lightwave circuit (PLC) substrate 405, a splitter 406, couplers 407, semiconductor optical amplifiers 408, a CW optical source 409, and a combiner 410.

First, optical modulation signals on a plurality of channels to be multiplexed are input through the optical modulation signal input port 401. FIG. 4 shows an example that inputs the four channel signals with the same bit rate. On the other hand, the optical clock signal with the same repetition rate as the bit rate of the modulation signal is input through the optical clock input port 402. The pulse width of the optical clock signal is narrower than the one time slot of the multiplexed signal.

The optical clock signal is split into optical clock signals of the same number of channels of the input optical modulation signals (four channels in this case) by the splitter 406. The optical clock signals propagate through optical waveguides formed on the PLC substrate, and are combined by the couplers 407 with the optical modulation signals propagating through optical waveguides on the PLC substrate. The optical clock signals and optical modulation signals, which are combined by the couplers 407, are input to the semiconductor optical amplifiers 408. In the semiconductor optical amplifiers 408, a four-wave mixing phenomenon, one of nonlinear optical effects, occurs by the incident optical clock signals and optical modulation signals. Thus, the semiconductor optical amplifiers 408 generate modulated optical pulses with a new wavelength and with optical intensities proportional to the optical intensity products between the optical clock signals and the optical modulation signals.

The wavelength $\lambda_{FWM}$ of the newly generated four-wave mixing light is given by the following equation because of the energy conservation.

$$1/\lambda_{FWM} = 1/\lambda_{sig} + 1/\lambda_{sig} - 1/\lambda_{clk}$$

where $\lambda_{sig}$ and $\lambda_{clk}$ are wavelengths of the optical signals and optical clock signal, respectively.

The detail of relationship between each wavelength is closed by Govind P. Agrawal, "Nonlinear fiber optics (second edition)", Academic Press, 1995, ISBN0-12-045142-5, P.404, "Chapter 10, Parametric Process".

The CW optical source 409 launches bias light into the individual semiconductor optical amplifiers 408 in advance. This makes it possible to suppress the pattern effect in which the modulation efficiency varies depending on the signal pattern, thereby being able to stabilize their outputs.

The generated four-wave mixing light beams propagate through the optical waveguides along with the optical signals and optical clock signals, and are multiplexed by the combiner 410. In other words, the optical clock signal propagates through the waveguides on the PLC substrate from the splitter 406 whereby the optical signal is split to the couplers 407 whereby optical modulation signals are coupled. The generated four-wave mixing beams propagate through the waveguides on the PLC substrate until multiplexed with the optical modulation signals by the combiner 410. The lengths of the waveguides are designed such that the sum of the relative time difference between the channels through which the optical clock signals propagate and the relative time difference between the channels through which the four-wave mixing beams propagate becomes equal to one time slot of the multiplexed signal between adjacent channels. As a result, the optical modulation pulse outputs of the channels after the multiplexing are placed on the time axis at regular intervals.

FIG. 5 is a graph illustrating the output waveforms after the multiplexing on a time axis, that is, a horizontal axis. As referred to FIG. 5, the time-division-multiplexed output can be obtained by extracting only the four-wave mixing beams from the outputs of the PLC substrate by means of the optical filter 404.

However, the conventional integrated multiplexing circuit has the following problems. First, the conventional multiplexing circuit is comprised by the glass waveguides and the semiconductor optical amplifiers which are nonlinear optical devices on the same substrate. The two components, however, differ in diameters of the optical beams propagating through their waveguides. This causes a coupling loss of about 3 dB at each connection point, thereby degrading the signal-to-noise ratio. In addition, since the semiconductor optical amplifiers generate noise called amplified spontaneous emission noise, they also reduce the signal-to-noise ratio.

In addition, it is necessary for the conventional multiplexing circuit to launch the CW light beams to stabilize the generation of the four-wave mixing in the semiconductor optical amplifiers, which presents another problem of complicating the configuration. Furthermore, as clearly seen from the diagram showing the configuration, the optical waveguides corresponding to the individual channels must be connected to the semiconductor optical amplifiers in implementing the circuit. This offers a problem of increasing time and effort for implementation in proportion to the number of channels.

The present invention is implemented to solve the foregoing problems. Therefore an object of the present invention is to fabricate a plurality of nonlinear optical waveguide devices and silica optical waveguides through a small number of process steps. Another object of the present invention is to achieve the simplification of the fabrication process by using the hybrid integration technique; and stabilization of the operation by reducing the connection loss.

SUMMARY OF THE INVENTION

To accomplish the foregoing objects, according to a first aspect of the present invention, there is provided an optical modulation/multiplexing circuit comprising: (N+1) input ports each for inputting one of an optical clock signal with a fixed repetition period t and N optical modulation signals with the period t, where N is an integer greater than one; splitting means for splitting the optical clock signal into N portions; first combining means for making each of N optical clock signals split by the splitting means, delay with certain time differences, and for multiplexing each of the N optical modulation signals with one of the optical clock signals made delay with the time differences; N nonlinear optical media each for receiving one of output light beams from the first combining means, and for generating an output light beam by second order nonlinear optical effect; second combining means for receiving N output light beams the N nonlinear optical media generates and for multiplexing them after making delay them with certain time differences; and means for optically extracting from the output of the second combining means, only signal pulses corresponding to a wavelength component newly produced in the nonlinear optical media, wherein the output of the second combining means includes the wavelength component newly produced in the nonlinear optical media, and signal pulses arranged at a regular period t/N on a time axis without being overlapped.

Here, the second order nonlinear optical effect produced in the nonlinear optical media may be a difference frequency generation (DFG) process, and an optical frequency w3 of the signal pulses with the wavelength component newly generated in the nonlinear optical media may satisfy one of relationships w3=w1−w2 and w3=w2−w1, where w1 is an optical frequency of the optical clock signal, and w2 is an optical frequency of the optical modulation signal.

The second order nonlinear optical effect produced in the nonlinear optical media may be difference frequency generation following second harmonic generation (SHG), and an optical frequency w3 of the optical modulation signals with the wavelength component newly generated in the nonlinear optical media may satisfy one of relationships w3=2w1−w2 and w3=2w2−w1, where w1 is an optical frequency of the optical clock signal, and w2 is an optical frequency of the optical modulation signals.

The nonlinear optical media may be each composed of a lithium niobate ($LiNbO_3$) optical waveguide with a domain inversion structure.

The splitting means, the first combining means, and the second combining means may be each composed of N silica waveguides disposed on a silicon substrate.

The N nonlinear optical media may be composed of N lithium niobate ($LiNbO_3$) optical waveguides with a domain inversion structure, and the N optical waveguides may be disposed at regular intervals equal to intervals at an output end of the silica waveguides of the first combining means disposed on the silicon substrate, or to intervals at an input end of the silica waveguides of the second combining means disposed on the silicon substrate.

In summary, an all optical modulation and time-division-multiplexing circuit in accordance with the present invention employs as nonlinear optical switches, lithium niobate ($LiNbO_3$) optical waveguides with a domain inversion structure using cascaded $\chi^{(2)}$ processes. It implements the functions necessary for modulation and multiplexing such as input, splitting, multiplexing and timing adjustment of the optical signals and optical clock signal by connecting glass waveguides to the input and output terminals of the nonlinear optical waveguides.

According to the present invention, the PLC formed on the silicon substrate can be coupled to the plurality of domain inversion quasi-phase matching optical waveguides formed on the $LiNbO_3$ substrate at a time, thereby implementing the optical modulation and multiplexing circuit. Consequently, it can save time and effort for implementing it in spite of an increase in the number of the channels of the optical signals, and achieve low connection loss and low noise characteristic. Thus, the optical modulation/multiplexing circuit in accordance with the present invention offers great advantages when applied to high-speed optical communications.

The above and other objects, effects, features and advantages of the present invention will become more apparent from the following description of embodiments thereof taken in conjunction with the accompanying drawings.

DETAILED DESCRIPTION OF PREFERRED EMBODIMENTS

The invention will now be described with reference to the accompanying drawings.

Figure 1:
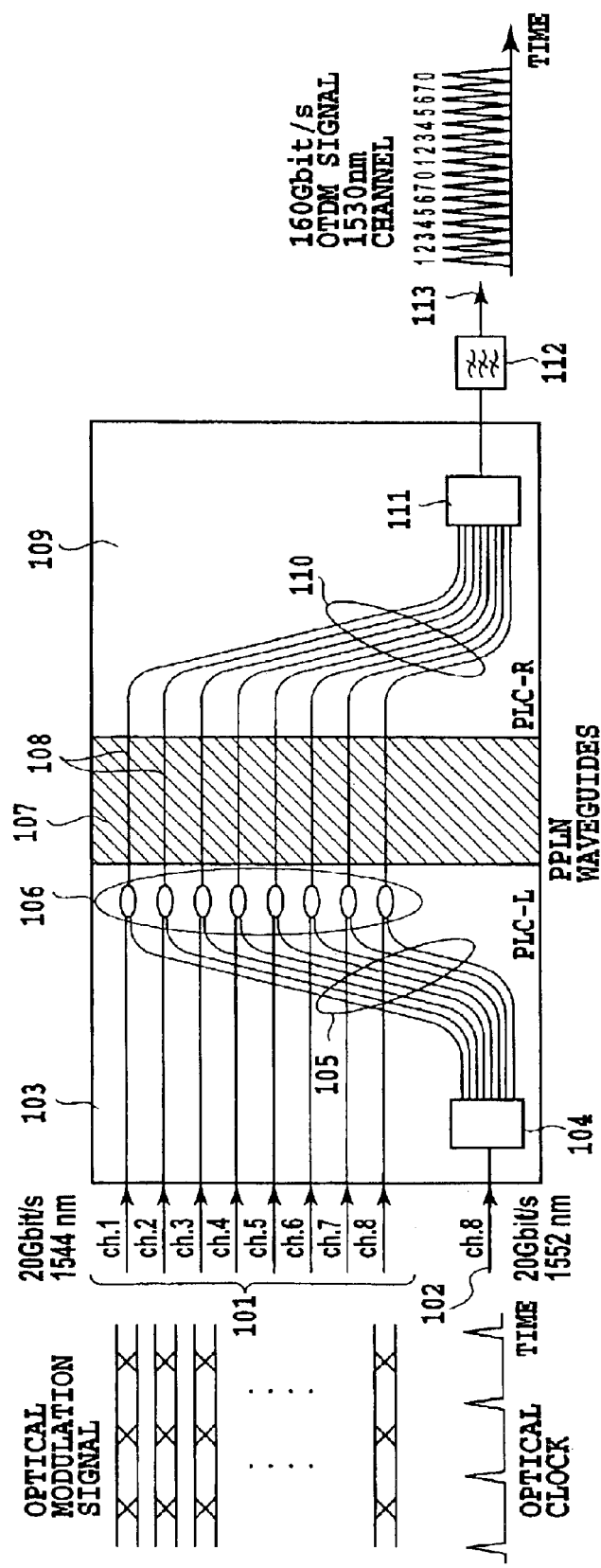
FIG. 1 is a block diagram showing a configuration of an embodiment of the optical modulation/multiplexing circuit in accordance with the present invention.

FIG. 1 is a block diagram showing a configuration of an embodiment of the optical modulation/multiplexing circuit in accordance with the present invention. The present embodiment comprises an optical modulation signal input port 101, an optical clock input port 102, a PLC (planar lightwave circuit) substrate 103, a splitter 104, optical waveguides 105, couplers 106, a $LiNbO_3$ substrate 107, domain inversion optical waveguides 108, a PLC substrate 109, optical waveguides 110, a combiner 111, an optical filter 112 and a multiplexed optical signal output port 113.

The operation of the optical modulation/multiplexing circuit in accordance with the present invention will be described.

The present embodiment is the same as the conventional technique in that it modulates divided optical clocks with multiple optical modulation signals (eight-channel in FIG. 1), and multiplexes the modulated optical clocks on a time axis. The present embodiment, however, differs from the conventional technique in that it utilizes the characteristics of the nonlinear optical devices for carrying out all optical modulation. This enables the hybrid integration of the $LiNbO_3$ substrate with the PLC circuit and the multiplexing of the optical modulation signals much more efficiently than in the conventional technique. The present embodiment uses lithium niobate ($LiNbO_3$) optical waveguides with quasi-phase matching as the material of the domain inversion optical waveguides 108.

Figure 2A:
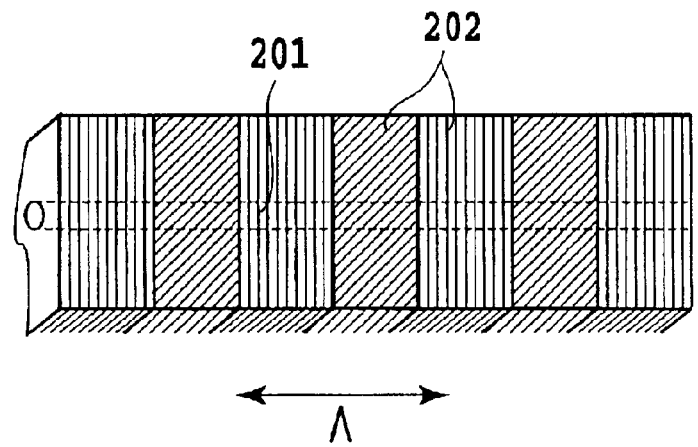
FIG. 2A is a diagram showing an example of a domain inversion optical waveguide using quasi-phase matching.
Figure 2B:
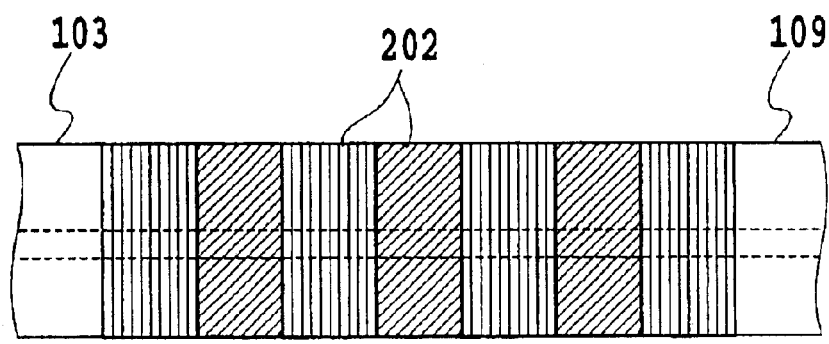
FIG. 2B is a diagram showing an example of a domain inversion optical waveguide coupled the PLC substrate.

FIG. 2A is a diagram showing an example of the domain inversion optical waveguide using the quasi-phase matching. The domain inversion optical waveguide includes an optical waveguide 201, and domain inversion regions 202.

The device has a domain inversion polarization grating with a period Λ formed in the direction perpendicular to the traveling direction of the optical waveguide. The lithium niobate ($LiNbO_3$) optical waveguide with the quasi-phase matching utilizes a second order nonlinear optical phenomenon ($\chi^{(2)}$ process) as a nonlinear optical phenomenon. The present invention carries out wavelength conversion through a cascaded $\chi^{(2)}$ processes that cause two second order nonlinear optical effects simultaneously in the optical waveguide. First, the incoming optical modulation signal causes second harmonic generation (SHG) based on the first second order nonlinear optical effect, followed by generating a light beam with a wavelength half that of the optical modulation signal. Subsequently, the generated SHG light beam produces a difference frequency generation (DFG) phenomenon, based on a second second-order nonlinear optical effects, between the SHG light beam and the optical clock, thereby generating an output light beam with a new wavelength.

The wavelength $\lambda_{out}$ of the output light beam generated in the cascaded process is given as follows.

$$\lambda_{SHG}=\lambda_{sig}/2 \tag{1}$$

$$1/\lambda_{out}=1/\lambda_{SHG}-1/\lambda_{clk} \tag{2}$$

Figure 3:
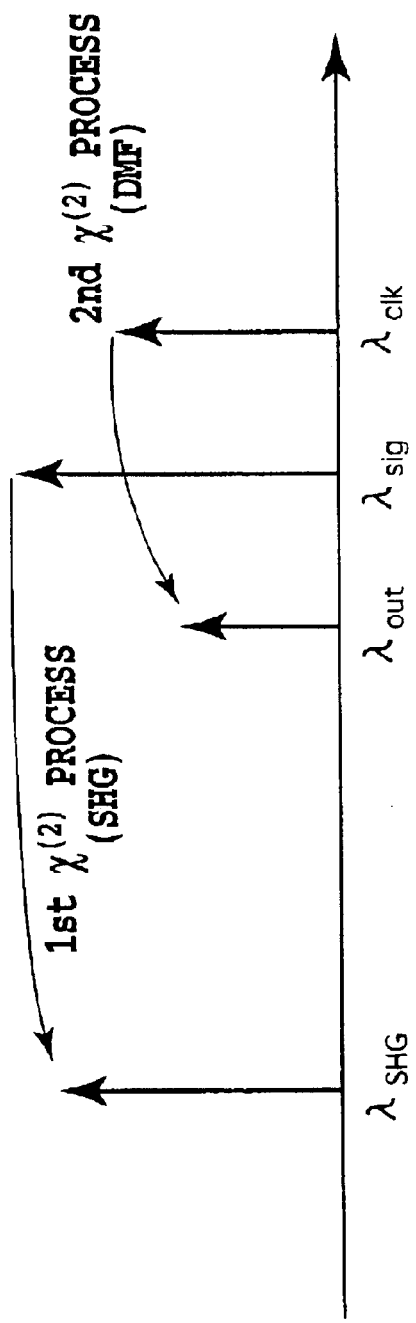
FIG. 3 is a graph illustrating the relationships between the wavelengths in two processes.
Figure 4:
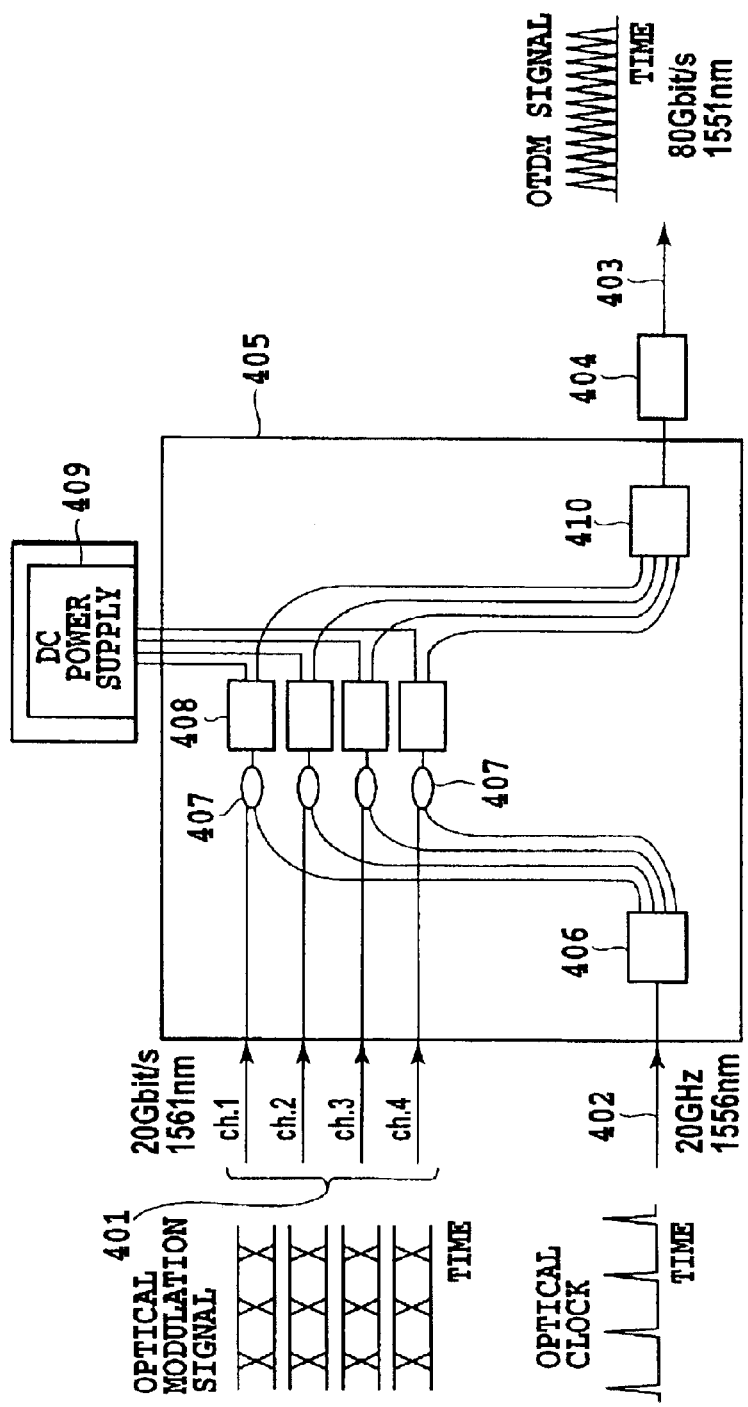
FIG. 4 is a diagram showing a configuration of a conventional optical modulation/multiplexing circuit.
Figure 5:
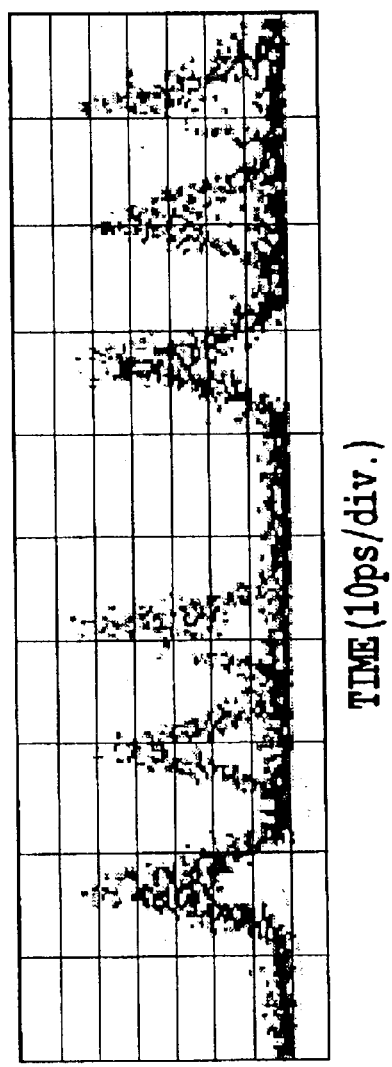
FIG. 5 is a graph illustrating behavior of output waveforms after multiplexing on a time axis which is a horizontal axis.

Hence $$1/\lambda_{out}=1/\lambda_{sig}=1/\lambda_{sig}-1/\lambda_{clk} \tag{3}$$

where $\lambda_{sig}$ is the wavelength of the optical modulation signal, $\lambda_{SHG}$ is the wavelength of the SHG light beam and $\lambda_{clk}$ is the wavelength of the optical clock signal. FIG. 3 shows the relationships between the wavelengths in the two processes. FIG. 3 illustrates that the difference between the optical frequency of the output light beam and that of the optical modulation signal is equal to the difference between the frequency of the optical modulation signal and that of the optical clock signal.

The relationship is the same as the third-order nonlinear optical phenomenon ($\chi^{(3)}$ process) such as phenomenon caused by the four-wave mixing. In the 1.55-micrometer wavelength band, the output light beam and the optical clock signal are nearly line symmetry with respect to the optical modulation signal in their wavelengths. The $LiNbO_3$ optical waveguide with the quasi-phase matching structure using the cascaded $\chi^{(2)}$ processes has a larger nonlinear optical constant than that using the $\chi^{(3)}$ process. In the foregoing reference, a four centimeter long device generates the output nearly equal to the output of the four-wave mixing of an optical fiber of about one kilometer. In the conventional configuration, the wavelength of the optical modulation signal is set at 1550 nm.

When a light beam with a different wavelength propagates through the $LiNbO_3$ optical waveguide, a phase mismatch occurs. The phase mismatch $\Delta\beta$ is given by the following equation.

$$\Delta\beta = \beta_{SHG} \cdot \beta_{sig} - \beta_{out} \tag{4}$$

$$= (n_{SHG}/\lambda_{SHG}) \cdot (n_{sig}/\lambda_{sig}) \cdot (n_{out}/\lambda_{out})$$

The phase mismatch periodically makes the SHG conversion efficiency and DFG conversion efficiency in the $LiNbO_3$ optical waveguide zero at the phase $2\pi$. Accordingly, extending the waveguide cannot increase the conversion efficiency. The domain inversion polarization grating structure compensates for the phase mismatch by inverting the polarization of the crystal in the regions at which the phase mismatch shifts from $\pi$ to $2\pi$, thereby securing a high conversion efficiency. The period $\Lambda$ of the polarization inversion is determined such that the phase matching conditions for the propagation constants of the SHG light beam, incoming light beam and outgoing light beam in the optical waveguide satisfy the following equation.

$$\beta_{SHG}=\beta_{sig}+\beta_{out}+2\pi/\Lambda \tag{5}$$

where $\Lambda$ is about 14 micrometers when the wavelength of the optical modulation signal is 1550 nm.

Another characteristic of the optical waveguide in accordance with the present invention is that the mode field diameter of a light beam propagating through the optical waveguide is approximately equal to the diameter of a single mode optical fiber (about eight micrometers in diameter). Therefore the insertion loss (at 1550 nm wavelength band) is about 3 dB between single mode optical fibers which are attached to both ends of the 4-cm-long domain inversion optical waveguide. Considering that the propagation loss of the domain inversion optical waveguide itself is about 0.35 dB/cm, the connection loss between the single mode optical fiber and the present waveguide is about 1.3 dB, which is much smaller than the loss associated with the conventional semiconductor optical amplifier.

The technique for the low loss connection between the lithium niobate (LiNbO3) optical waveguide itself and the single mode optical fiber with the quasi-phase matching the present embodiment employs is disclosed by S. Kawanishi, M. H. Chou, K. Fujiura, M. M. Fejer and T. Morioka, "All Optical Modulation and Time-Division-Multiplexing of 100 Gbit/s Signal using Quasi-Phasematched Mixing in $LiNbO_3$ Waveguides" Electron Lett., 36, 1568-1569 (2000).

Focusing attention to the characteristics the present waveguide has, in the present embodiment, the plurality of domain inversion optical waveguides formed on the $LiNbO_3$ substrate 107 are connected to the PLC substrate directly. Thus, it can implement all optical modulation/multiplexing with a stable and very simple configuration.

First, a plurality of optical modulation signals to be multiplexed are incident onto the optical modulation signal input port 101. Although FIG. 1 shows the case where eight channels of NRZ optical modulation signals are input, the number of channels can be set freely. In addition, the coding scheme of the optical modulation signal is not limited to NRZ. Any other coding schemes such as RZ are applicable as long as they are intensity modulation.

On the other hand, the optical clock signal is input to the optical clock input port 102, split by the splitter 104, and combined with the individual input optical modulation signals by the couplers 106. The lengths of the waveguides on the PLC substrate used for launching into the nonlinear optical devices and the lengths of the waveguides on the PLC substrate up to the multiplexing of the outputs of the nonlinear optical devices are designed in the same manner as those in the conventional technique. Consequently, the time-division-multiplexed light is output in which the input signals are arranged at regular intervals on a time axis.

In the present embodiment, the plurality of domain inversion optical waveguides 108, that is, the nonlinear optical devices on the $LiNbO_3$ substrate 107, are formed at regular intervals. The present embodiment is characterized in that the intervals are made equal to the intervals on the connecting portions of the optical waveguides 105 and 110 formed on the PLC substrate 103 and 109 to the $LiNbO_3$ substrate 107. These waveguides can be formed at a time using a photolithography technique, and setting the intervals of the waveguides in the connecting portions at the regular intervals enables hybrid integration in a single splicing process. As a result, the time and effort to carry out the splicing can be greatly reduced as compared with the conventional technique that connects the individual nonlinear optical devices to the optical waveguides one by one.

As a method for splicing the substrates at a time, each of which includes a plurality of waveguides arranged at the regular intervals, there is a following method. First, waveguides on both PLC substrates and domain inversion optical waveguides are placed closely. Second, a light signal is launched into an appropriate one (such as one at the edge) of the plurality of waveguides. Third, the position of the substrates is adjusted with monitoring the intensity of the output light. The coupling loss between the substrates becomes minimum at the position at which the intensity becomes maximum. Since the intervals of the waveguides are identical in the two substrates, all the waveguides are spliced optimally through the foregoing process.

In addition, the connection loss can also be reduced because the mode field diameter of the optical pulses propagating through the optical waveguides on the $LiNbO_3$ substrate is approximately equal to the mode field diameter of the PLC waveguides (about eight micrometers). To splice the PLC substrate to the $LiNbO_3$ substrate, the existing technique is applicable. As for the splicing of the two PLC substrates, it is disclosed by F. Ebisawa et al., "High-speed 32-channnel optical wavelength selector using PLC hybrid integration", Technical Digest of Optical Fiber Communication conference (OFC), paper ThB1, San Diego, 1999. The technique is applicable to the splicing of the two different substrates, the PLC substrate and the $LiNbO_3$ substrate, enabling the implementation of the optical modulation and multiplexing circuit in accordance with the present invention.

Implementing the optical modulation/multiplexing circuit in accordance with the present invention in this way can not only reduce the size of the circuit and stabilize its operation, but also reduce the connection loss. Consequently, it can produce high signal-to-noise ratio output free from the noise of the semiconductor optical amplifiers, which cannot be avoided in the conventional technique.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

What is claimed is:

1. An optical modulation/multiplexing circuit comprising:
    (N+1) input ports each for inputting one of an optical clock signal with a fixed repetition period t and N optical modulation signals with the period t, where N is an integer greater than one;
    splitting means for splitting the optical clock signal into N portions;
    first combining means for making each of N optical clock signals, split by said splitting means, delay with certain time differences, and for multiplexing each of the N optical modulation signals with one of the optical clock signals made delay with the time differences;
    N nonlinear optical media each for receiving one of output light beams from said first combining means, and for generating an output light beam by second order nonlinear optical effect;
    second combining means for receiving N output light beams said N nonlinear optical media generates and for multiplexing them after making them delay with certain time differences; and
    means for optically extracting from the output of said second combining means, only signal pulses corresponding to a wavelength component newly produced in said nonlinear optical media, wherein
    the output of said second combining means, includes the wavelength component newly produced in said nonlinear optical media, and signal pulses arranged at a regular period t/N on a time axis without being overlapped.

2. The optical modulation/multiplexing circuit as claimed in claim 1, wherein the second order nonlinear optical effect produced in said nonlinear optical media is a difference frequency generation process, and wherein an optical frequency w3 of the signal pulses with the wavelength component newly generated in said nonlinear optical media satisfies one of relationships w3=w1−w2 and w3=w2−w1, where w1 is an optical frequency of the optical clock signal, and w2 is an optical frequency of the signal pulses.

3. The optical modulation/multiplexing circuit as claimed in claim 1, wherein the second order nonlinear optical effect produced in said nonlinear optical media is difference frequency generation following second harmonic generation, and wherein an optical frequency w3 of the signal pulses with the wavelength component newly generated in said nonlinear optical media satisfies one of relationships w3=2w1−w2 and w3=2w2−w1, where w1 is an optical frequency of the optical clock signal, and w2 is an optical frequency of the signal pulses.

4. The optical modulation/multiplexing circuit as claimed in claim 2 or 3, wherein said nonlinear optical media are each composed of a lithium niobate ($LiNbO_3$) optical waveguide with a domain inversion structure.

5. The optical modulation/multiplexing circuit as claimed in claim 2 or 3, wherein splitting means, said first combining means, and said second combining means are each composed of N silica waveguides disposed on a silicon substrate.

6. The optical modulation/multiplexing circuit as claimed in claim 5, wherein said N nonlinear optical media are composed of N lithium niobate ($LiNbO_3$) optical waveguides with a domain inversion structure, and wherein said N optical waveguides are disposed at regular intervals equal to intervals at an output end of the silica waveguides of said first combining means disposed on said silicon substrate, or to intervals at an input end of the silica waveguides of said second combining means disposed on said silicon substrate.

* * * * *

UNITED STATES PATENT AND TRADEMARK OFFICE
CERTIFICATE OF CORRECTION

PATENT NO. : 6,842,565 B2
DATED : January 11, 2005
INVENTOR(S) : Takuya Ohara et al.

It is certified that error appears in the above-identified patent and that said Letters Patent is hereby corrected as shown below:

Title page,
Item [56], References Cited, OTHER PUBLICATIONS, "S. Kawanishi et al.," reference, change "vol. 136" to -- vol. 36 --

Column 6,
Line 23, change "(LiNbO3)" to -- (LiNbO$_3$) --

Column 7,
Line 45, change "apparent" to -- appended --

Signed and Sealed this

Fifth Day of July, 2005

JON W. DUDAS
*Director of the United States Patent and Trademark Office*